United States Patent
Penton

[15] 3,652,299
[45] Mar. 28, 1972

[54] PROCESS OF MAKING SAUCE CONCENTRATES

[72] Inventor: Edgar W. Penton, Auburn, Wash.

[73] Assignee: Eduardo's Industries, Auburn, Wash.

[22] Filed: Dec. 5, 1969

[21] Appl. No.: 882,807

Related U.S. Application Data

[63] Continuation-in-part of Ser. No. 854,776, Sept. 2, 1969, abandoned, Continuation-in-part of Ser. No. 533,782, Mar. 14, 1966, abandoned.

[52] U.S. Cl. .............................................................99/144
[51] Int. Cl. ........................................................A23l 1/22
[58] Field of Search ..........................................99/144, 124

[56] References Cited

UNITED STATES PATENTS

| | | | |
|---|---|---|---|
| 2,168,360 | 8/1939 | Musher | 99/144 X |
| 2,679,281 | 5/1954 | Paulucci | 99/171 CP |
| 2,824,010 | 2/1958 | Pedersen | 99/171 CP |
| 3,245,805 | 4/1966 | O'Neill | 99/144 |

OTHER PUBLICATIONS

Rodgers, Quick Frozen Foods, Foodtrade Press Ltd. London 1958 pp. 260–263

Primary Examiner—Raymond N. Jones
Assistant Examiner—J. M. Hunter
Attorney—Eugene D. Farley

[57] ABSTRACT

A sauce concentrate, characterized by being a brittle solid at normal room temperature, composed of from 20–40 percent by weight of an edible fat which is a brittle solid at about 70° F. and has a melting point of 80°–40° F., from 20–40 percent by weight of a starch material, and from 20–40 percent by weight of food sauce flavoring materials made by melting the edible fat, dispersing therein the starch and flavoring materials, and cooling the resulting mixture.

13 Claims, No Drawings

PROCESS OF MAKING SAUCE CONCENTRATES

This application is a continuation-in-part of the patent application of Edgar W. Penton, Ser. No. 854,776, filed Sept. 2, 1969 for Process of Making Sauce Concentrates now abandoned, the same being a continuation-in-part of the patent application of Edgar W. Penton, Ser. No. 533,782, filed Mar. 14, 1966, also for Process of Making Sauce Concentrates now abandoned.

This invention relates to solid food sauce concentrates of the class designed for use in making sauces to be used on various vegetable, fish and meat dishes.

It is present commercial practice to supply, with the food products to which they are to be applied, sauce, soup and gravy concentrates in the form of dry powder mixes. These usually are marketed in foil envelopes or other hermetically sealed containers for the reason that the ingredients are hygroscopic in greater or lesser degree and if not hermetically sealed will acquire moisture from the atmosphere. In the moist condition not only do they cake and become difficult to disperse in liquid during use, but they also support mold and bacterial growth and thus become unfit for use.

It also is current commercial practice, particularly in connection with the sale of frozen vegetables, to supply food sauce concentrates in the form of refrigerated extruded products. These are manufactured by mixing starch, seasonings and other dry ingredients with margarine or selected fats at or close to room temperature. The resulting plastic products are extruded or shaped into pellets, cubes, loaves or slices. Such concentrates ordinarily require refrigeration for preservation during storage.

It is the general purpose of the present invention to provide a sauce concentrate in the form of a solid cake of predetermined shape and size, which may be packaged together with the food product to which it is to be applied, which need not be hermetically sealed, which need not be refrigerated during storage, and which in general is characterized by being:

1. A rigid, brittle solid at ordinary room temperature of 80° F. or below.
2. Fluid or semi-fluid so as to be moldable when heated to a temperature of 120°–160° F.
3. Essentially anhydrous and non-hygroscopic so as to inhibit bacteria and spore growth.
4. Not readily oxidizable, or effectively protectable by the addition of suitable antioxidants.
5. In the molten condition, readily dispersable in hot water to form a uniform emulsion which will thicken on heating to the boiling point during its conversion to the finished sauce.

The sauce concentrate meeting the foregoing criteria broadly comprises from 20–40 percent by weight of edible fat chacterized by being a brittle solid at about 70° F. and having a melting point of from 80°–120° F.; from 20–40 percent by weight of a starch material; and from 20–40 percent by weight of selected food sauce flavoring materials. A proportion of a suitable emulsifying agent preferably is included in the fat.

The sauce concentrate is manufactured by heating the fat to a temperature which is above its melting point but below its decomposition temperature after which the starch material and sauce flavoring materials are dispersed in the fat and intimately mixed together. The resulting mixture then is cast into selected shapes and packaged together with the food product with which it is to be used or, in the alternative, coated directly upon pieces of the food product.

The sauce then may be stored, transported and sold without refrigeration. When it is to be used by the consumer, it is necessary only to mix it with water, bring the water to a boil to thicken and disperse the concentrate, and to apply the resulting thickened sauce to the food.

Considering the foregoing in greater detail:

A variety of vegetable and animal fats may be employed in the manufacture of the herein described sauce concentrates provided they meet the general requirements noted above of being brittle solids at temperatures of about 70° F. or below, and of having melting points at or near body temperatures, i.e., from 80°–120° F. preferably from 90°–105° F.

If the melting point of the fat is substantially below the indicated level, the concentrate will be too soft for practical use. On the other hand, if the melting point of the fat is much above the indicated level, it will tend to leave a disagreeable greasy aftertaste when eaten.

In the hardened condition the fat should have a brittle character rather than ductile or plastic properties. Its properties with respect to water should be such that it will melt in hot water and disperse without encapsulation. Stated otherwise, for clean breakout from packaging containers, the fat should be brittle at temperatures up to about 70° F. For solidity it should have a melting point of above 80° F., preferably above 90° F. For proper taste, mouth feel and non-greasiness the fat should have a melting point of less than 120° F., preferably less than 105° F.

To elaborate further: A brittle fat as defined herein is one which is not plastic pliable, flexible nor ductile. In accordance with the definition of "brittle" given in the Britannica World Language Dictionary, a fat is brittle if it is frangible and liable to break, or snap.

In fat technology there is no standard and accepted measure of brittleness. However, for present purposes, a fat is deemed brittle if a wafer 3 inches in diameter and three-eighths inch thick shall fracture and separate into pieces when subjected to torsion stress, as contrasted with bending or deforming. A practical test for brittleness is as follows:

First, clamp in a horizontal position between two flat parallel surfaces a test piece comprising a molded disc of the fat, 3 inches in diameter by 0.33 inch thick. This gives a diametrical cross section of 1 square inch.

Second, apply a quick force perpendicular to the outermost edge of the disc. The amount of force applied should be sufficient either to fracture the piece or to deflect the outermost edge a distance of one-fourth inch. To achieve this, the force may be applied manually by the operator's finger.

If the test piece fractures and breaks cleanly along the line of the clamp, without deflecting more than one-fourth inch, at a temperature of 70° F. or above, the fat is a brittle fat for the purpose of the present invention.

Another test useful in defining a brittle fat comprises a modified durometer-penetrometer test.

In carrying out this test, there is used a classification ASTMD 676–59T durometer having a plunger projecting one-tenth inch from a flat surface. The durometer has a spring-loaded dial-indicating pointer arranged to read in grams the pressure on the plunger. When properly adjusted, a pressure on the end of the plunger sufficient to depress it one-tenth inch will indicate 1,000 grams.

In the testing of fats for brittleness, the above durometer is modified by placing a metal disc one-tenth inch thick on the surface of the fat to be tested. With the durometer plunger in the center of the disc, the disc is quickly pressed into the fat by the plunger until the flat surface of the durometer is in contact with the surface of the fat. At the same time, the maximum scale pressure is read.

A fifth illustrative fat is Durkee's "CCC." This is a hydrogenated vegetable fat having the following American Oil Chemists Association specifications:

| | |
|---|---|
| Color (Lovibond) | 3r–30y (Max.) |
| Free fatty acid | 0.20 (Max). |
| Congeal Point | 37–1 |
| Solid Fat Index | |
| °F. | |
| 50 | 55±3 |
| 70 | 45±3 |
| 92 | 25±2 |
| 104 | 9±1.5 |
| AOM - Stability | 200 hours (min.) |

In addition, there may be incorporated to advantage with the fatty material a suitable dispersing or emulsifying agent for assisting in emulsifying the fat with the water during preparation of the final sauce. The dispersing agent employed should be compatible with the fat, edible and not adversely affected by storage.

The dispersing agents employed in stabilizing foods, i.e., the mono- and diglycerides of the fat-forming higher fatty acids such as stearic acid, oleic acid and their hydrogenated derivatives are particularly suitable.

Also suitable are such edible emulsifying agents as the sorbitan fatty acid esters, the polyoxyethylene sorbitan fatty acid esters, the polyoxyethylene sorbitol esters, the polyoxyethylene fatty acids, and the poloxyethylene higher aliphatic alcohols, e.g., lauryl, cetyl, stearyl, oleyl and tridecyl alcohols.

Another example of a suitable fat is a confectioners fat having the following specifications:

| | °F | Index |
|---|---|---|
| Solid fat index | 51 | 53–57 |
| | 70 | 43–47 |
| | 89 | 24–28 |
| | 108 | 7–12 |
| Wylie melting point | | 115° F. |
| Moisture | | none |
| Free fatty acid | maximum | 0.05% |
| Iodine value | | 50 |

A third example of a suitable fat is a hydrogenated vegetable oil having the following specifications. (Durkee's "Melvo")

| | |
|---|---|
| Color (Lovibond) | 2r–20y |
| Free Fatty acid | 0.20 (maximum) |
| Wylie Melting Point | 99–103 |
| Stability (OAM) | 200 hours |

A fourth example of a suitable fat is Durkee's "Kaomel," a fraction of hydrogenated vegetable oils having the following specifications:

| | |
|---|---|
| Color (Lovibond) | 2.0r–20y (max.) |
| Free Fatty acid | 0.20 (max.) |
| Wylie Melting Point | 98–100.5 |
| Solid Fat Index | |
| °F. | |
| 50 | 72±3 |
| 70 | 66±3 |
| 80 | 59±3 |
| 92 | 23±3 |
| 100 | 5 (max.) |
| Stability (AOM) | 200 hours (min.) |

Fats having the above noted desirable characteristics may be derived by fractional distillation and/or solid crystallization of the well known edible oils such as cottonseed oil, soya bean oil, cocoanut oil, corn oil, safflower oil, lard, or the hydrogenated derivatives of these fats. Fractional distillation and solvent crystallization may be effectuated using standard techniques.

For example, in solid crystallizing, the fat may be dissolved in liquid propane and chilled to precipitate the desired fat fraction. The mixture then may be centrifuged or filtered to separate the solid fat from the undesirable components, principally lauric acid. The latter is not a preferred fat since it imparts poor shelf life and stability to the product.

If desired, fats of varying derivation may be blended together in order to derive at the desired physical qualities. The object of such blending is to provide a fat which has a narrow plastic range, i.e., a narrow range between softening point and melting point. Thus there may be mixed together a fat having a narrow plastic range and low melting point with a fat having a high melting point and with a dispersing agent which acts as a bridging material. The net result is a product having the desired intermediate melting point and narrow plastic range.

One example of a suitable blending fat is a margarine oil having the following specifications:

| | °F. | Index |
|---|---|---|
| Solid fat index | 51 | 29–31 |
| | 70 | 18–20 |
| | 95 | 3–4 |
| Moisture | | none |
| Free Fatty acid | maximum | 0.05% |
| Peroxide Value | maximum | 0.3 m.e. |

Various diameters of discs may be used for different ranges of hardness, but the one most useful for the present purpose is one having a diameter of three-eighths inch. When harder fats are measured, a ¼ inch diameter disc is used. 440 grams pressure on the ¼ inch disc is equal to 1,000 grams pressure on the ⅜ inch disc, so a conversion of readings with the one instrument enables translation of readings into a single reference scale.

For the present purposes, a fat which is sufficiently hard to be termed "brittle," is one requiring 1,000 grams or more for penetration of a ⅜ inch disc for a distance of 0.1 inch.

Applying the foregoing modified durometer-penetrometer test to a series of fats of different hardness and hence of different brittleness, using a ⅜ inch disc, there were obtained the following results:

| Fat | Wt. (gr) required for 1/10 inch penetration | M.P. (°F.) |
|---|---|---|
| A | 100 | 88 |
| B | 500 | 86 |
| C | 600 | 85 |
| D | 700 | 87 |
| E | 1000 | 110 |
| F | 1150 | 98 |
| G | 1250 | 115 |

Of the foregoing fats only fats E, F and G meet the requirements of being brittle solids. Of these three fats, only fat F is of preferred overall quality since its melting point falls within the preferred range of 90°–105°, approximating body heat.

A typical emulsifying agent for use in the presently described concentrates comprises a mixture comprising about 45 percent by weight monoglyceryl stearate and about 45 percent by weight diglyceryl stearate, the mixture having the following specifications:

| | |
|---|---|
| Saponification value | 155–165 |
| Iodine value (maximum) | 3 |
| Glycerol content (maximum) | 1.0% |
| Free fatty acids as stearic acid (maximum) | 1.5% |
| Congeal point | 154° F. |
| Cloud point | 156° F. |
| Clear point | 163° F. |

A sufficient amount of the emulsifying agent is employed to bring about the desired degree of emulsification of the concentrate in water and stabilization of the resulting emulsion. This requires from 1–10 percent by weight of emulsifying agent, based on the total weight of the fat component of the sauce concentrate.

There thus may be employed to advantage as the fat component a mixture of from 35–50 percent by weight of a margarine type vegetable oil having a melting point of about 75° F., from 35–50 percent by weight of shortening having a melting point of about 110° F., and from 1–10 percent by weight of an emulsifying agent comprising the commercial glyceride product sold under the name "Myverol," the same being a mixture melting at about 145° F. and containing about 45 percent monoglycerol stearate and 45 percent diglycerol stearate. The resulting concentrate has a durometer-penetrometer value of 1,300 and a melting point of 98° F.

Another effective combination to be used as a fat component of the sauce concentrate is one comprising 75 percent non-lauric margarine oil having a melting point of about 75° F. about 20 percent non-lauric confectioners fat having a melting point of about 110° F. and about 5 percent of a glyceride emulsifying agent comprising the above described mixture of mono- and diglycerol stearates. This concentrate has a durometer-penetrometer value of 1,400 and a melting point of 100° F.

The starch material which is another of the major components of the herein described sauce concentrate serves a thickening and viscosity control function. It may comprise pure starch derived from any of the usual commercial sources ore mixtures of natural or synthetic mixtures of starch with other materials. Potato starch, arrowroot starch, wheat starch and rice starch are commonplace examples.

The third major constituent of the herein described sauce concentrate comprises the "sauce flavoring materials" employed to impart to the final product its characteristic flavor and taste characteristics. These are the ingredients which determine the sauce type. They vary widely, depending upon the identity of the sauce it is desired to prepare.

For example, in preparing a cream sauce, the primary constituents of the sauce flavoring component comprise merely dry milk, salt, pepper and other seasonings.

If a cheese sauce concentrate is to be prepared, the sauce flavoring ingredients comprise milk solids, cheese and seasonings.

If a spaghetti sauce concentrate is to be prepared, the sauce flavoring may constitute dehydrated onion chips and various seasonings.

In the event that an ala king sauce is contemplated, then the flavoring constituents may comprise dehydrated mushrooms, pimiento, and other dehydrated vegetables.

Thus simply by varying the sauce flavoring materials employed, a wide variety of sauce concentrates may be prepared.

In the manufacture of the sauce concentrate the general objective is to blend with the fat base the starch and solid flavoring materials in such a manner as to promote uniform and intimate dispersion of the solid materials throughout the fat, and in such a manner as to maintain maximum crystallization of the fat on cooling.

This objective is accomplished best by a two-stage process in which the fat is heated to a relatively high temperature of about 160° F. and, while maintaining the fat at about this temperature, adding the starch with high speed agitation. Flavor material such as cheese, which are meltable at the indicated temperature, also may be added during this stage. The agitation is continued until the starch particles are surrounded by, and intimately associated with, the fat.

In the second stage, the temperature of the resulting dispersion is lowered to about 140° F. or lower, after which the remaining dry solid ingredients are added in finely divided form, with slow speed mixing. Mixing is continued until complete wetting out of the solid particles with the fat, and a uniform dispersion throughout the mixture has been obtained. At the end point the mixture has a consistency at 130° F. equivalent to a heavy batter or a thin putty.

Several procedures then may be followed to finish making the ultimate sauce concentrate product, depending upon the food product to which it is to be applied, as well as the form or shape in which the concentrate is to be prepared.

In one procedure, adapted to casting or molding the concentrate into the form of wafers, pellets, buds and beads, the hot viscous mixture is run into molds of the desired shape, vibrated to shake out air bubbles, and cooled to the specification temperature. This procedure is particularly applicable to molding the sauce concentrates into discs contained in containers marketed under the brand name of "SAUCE KAPS," i.e., sauce-containing plastic caps which may be pressed on conventional tin cans containing the food product to which the sauce is to be applied.

In another application, the molten sauce concentrate may be cast, molded or shaped into the form of pellets or small wafers which then may be mixed with dry food products such as dehydrated potatoes, noodles, macaroni, rice, or beans as, for example, when it is desired to make potatoes au gratin, macaroni and cheese, Spanish rice, etc.

In still another application the hot viscous concentrate may be sprayed on or otherwise applied to the food product to which it is to be associated. For example, a cream sauce or cheese sauce may be sprayed on dehydrated potato slices passing on a belt conveyor. Upon cooling, the concentrate forms a hard coating over the slices which then may be packaged in a suitable container. To prepare the food product, it merely is necessary to add the specified amount of water and bake, producing escalloped or au gratin potatoes. Many other types of food products, including frozen food products, may be prepared in a similar manner.

It thus will be apparent that by the present invention, I have provided a novel food sauce concentrate and process for preparation of the same, which concentrate is versatile in its application to many categories of food sauces, soups and gravies. The concentrate is characterized by the primary advantage of not being subject to bacterial or mold growth. Accordingly it does not require hermetic sealing. In its end use the sauce concentrate is easily converted to the finished sauce. In addition, it lends itself to a unique marketing procedure in which the packaged concentrate may be affixed directly to a can containing the food to which the sauce is to be applied or by coating pieces of the food product directly with the concentrate.

Having thus described my invention in preferred embodiments, I claim:

1. The process of making brittle solid food sauce concentrates comprising
   a. providing, out of a total concentrate composition of 100 percent by weight,
      1. from 20–40 percent by weight of an edible fat which is a brittle solid at substantially 70° F. and which has a melting point of from 80°–120° F.
      2. from 20–40 percent by weight of a starch material,
      3. from 20–40 percent by weight of food sauce flavoring materials,
   b. heating the fat to a temperature which is above its melting point but below its decomposition temperature,
   c. dispersing in the molten fat the starch material and the sauce flavoring materials, and
   d. cooling the resulting mixture to a temperature which is below the solidification temperature thereof,
   e. the resulting cooled mixture being characterized by being a brittle solid at normal room temperature not exceeding 80° F.,
   f. brittle being defined as requiring, in a durometer-penetrometer test, at least 1,000 grams for penetration of a ⅜ inch disc for a distance of 0.1 inch.

2. The process of claim 1 wherein the starch material is dispersed first in the molten fat, the sauce flavoring materials thereafter being mixed in the resulting hot dispersion.

3. The process of claim 1 wherein the fat first is heated to a temperature of about 160° F., and the starch material dispersed in the hot fat, after which the fat is cooled to a temperature below 140° F. and the sauce flavoring materials mixed into the resulting cooled, but still molten, dispersion.

4. The process of claim 1 including the step of casting the molten product into predetermined shapes.

5. The process of claim 1 including the step of casting the molten product into predetermined shapes in a receptacle and attaching the receptacle to a container containing food with which the sauce is to be used.

6. The process of claim 1, wherein said fat is selected from the group consisting of the following fats and mixtures thereof:

a. a margarine oil having the following specifications:

|  | °F | Index |
|---|---|---|
| Solid fat index | 51 | 29–31 |
|  | 70 | 18–20 |
|  | 95 | 3–4 |
| Moisture |  | none |
| Free Fatty acid | maximum | 0.05% |
| Peroxide Value | maximum | 0.3 m.e. | b. a confectioners fat having the following specifications:

|  | °F. | Index |
|---|---|---|
| Solid fat index | 51 | 53–57 |
|  | 70 | 43–47 |
|  | 89 | 24–28 |
|  | 108 | 7–12 |
| Wylie melting point |  | 115° F. |
| Moisture |  | none |
| Free fatty acid | maximum | 0.05% |
| Iodine value |  | 50 | c. a hydrogenated vegetable oil having the following specifications:

| Color (Lovibond) | 2r-20y |
|---|---|

| | |
|---|---|
| Free Fatty acid | 0.20 (maximum) |
| Wylie Melting point | 99–103 |
| Stability (OAM) | 200 hours | d. a fraction of hydrogenated vegetable oils having the following specifications:

| | |
|---|---|
| Color (Lovibond) | 2.0r–20y (max.) |
| Free Fatty Acids | 0.20 (max.) |
| Wylie Melting Point | 98–100.5 |
| Solid Fat Index °F. | |
| 50 | 72±3 |
| 70 | 66±3 |
| 80 | 59±3 |
| 92 | 23±3 |
| 100 | 5 (max). |
| Stability (AOM) | 200 hours (min.) | and (e) a hydrogenated vegetable fat having the following specifications:

| | |
|---|---|
| Color (Lovibond) | 3r–30y (Max.) |
| Free fatty acid | 0.20 (Max.) |
| Congeal Point | 37–1 |
| Solid Fat Index °F. | |
| 50 | 55±3 |
| 70 | 45±3 |
| 92 | 25±2 |
| 104 | 9±1.5 |
| AOM - Stability | 200 hours (min.) |

7. A food sauce concentrate characterized by being a brittle solid at normal room temperatures not exceeding 80° F. and comprising a solidified mixture including:
a. from 20–40 percent of an edible fat which is a brittle solid at substantially 70° F. and has a melting point of from 80°–120b$L$ F.,
b. from 20–40 percent of a starch material,
c. and from 20–40 percent of food sauce flavoring components,
d. the starch material and food sauce components being intimately dispersed through the fat,
e. brittle being defined as requiring, in a durometer-penetrometer test, at least 1,000 grams for penetration of a ⅝ inch disc for a distance of 0.1 inch.

8. The food sauce concentrate of claim 7 wherein the edible fat comprises from 35–50 percent margarine-type vegetable oil melting at about 75° F., from 35–50 percent vegetable shortening melting at about 110° F., and from 1–10 percent of the glycerol esters of the higher fatty acids.

9. The food sauce concentrate of claim 8 wherein the glycerol esters of the higher fatty acids comprise glyceryl mono- and distearates.

10. The food sauce concentrate of claim 7 wherein the edible fat comprises from 35–50 percent margarine-type vegetable oil melting at about 75° F., from 35–50 percent animal shortening melting at about 110° F., and from 1–10 percent of the glycerol esters of the higher fatty acids.

11. The food sauce concentrate of claim 7 wherein the edible fat comprises from 70–80 percent margarine type vegetable oil melting at about 75° F., from 15–25 percent vegetable shortening melting at about 110° F., and from 1–10 percent mono- and diglycerol stearates.

12. The food sauce concentrate of claim 7 including solid pieces of food enveloped by and coated with the solid concentrate.

13. The food sauce concentrate of claim 7, wherein said fat is selected from the group consisting of the following fats and mixtures thereof:

a. a margarine oil having the following specifications:

| | °F | Index | |
|---|---|---|---|
| Solid fat index | 51 | 29–31 | |
| | 70 | 18–20 | |
| | 95 | 3–4 | |
| Moisture | | none | |
| Free Fatty Acid | maximum | | 0.5% |
| Peroxide Value | maximum | | 0.3 m.e. | b. a confectioners fat having the following specifications:

| | °F. | Index | |
|---|---|---|---|
| Solid Fat index | 51 | 53–57 | |
| | 70 | 43–47 | |
| | 89 | 24–28 | |
| | 108 | 7–12 | |
| Wylie melting point | | 115° F. | |
| Moisture | | none | |
| Free fatty acid | maximum | | 0.05% |
| Iodine value | | | 50 | c. a hydrogenated vegetable oil having the following specifications:

| | |
|---|---|
| Color (Lovibond) | 2r–20y |
| Free fatty acid | 0.20 (maximum) |
| Wylie Melting point | 99–103 |
| Stability (OAM) | 200 hours | d. a fraction of hydrogenated vegetable oils having the following specifications:

| | |
|---|---|
| Color (Lovibond) | 2.0r – 20y (max.) |
| Free Fatty Acids | 0.20 (max.) |
| Wylie Melting Point | 98–100.5 |
| Solid Fat Index °F. | |
| 50 | 72±3 |
| 70 | 66±3 |
| 80 | 59±3 |
| 92 | 23±3 |
| 100 | 5 (max.) |
| Stability (AOM) | 200 hours (min.) | and (e) a hydrogenated vegetable fat having the following specifications:

| | |
|---|---|
| Color (Lovibond) | 3r–30y (max.) |
| Free fatty acid | 0.20 (Max.) |
| Congeal Point | 37–1 |
| Solid Fat Index °F. | |
| 50 | 55±3 |
| 70 | 45±3 |
| 92 | 25±2 |
| 104 | 9±1.5 |
| AOM - Stability | 200 hours (min.) |

* * * * *

UNITED STATES PATENT OFFICE
CERTIFICATE OF CORRECTION

Patent No. 3,652,299     Dated March 28, 1972

Inventor(s) Edgar W. Penton

It is certified that error appears in the above-identified patent and that said Letters Patent are hereby corrected as shown below:

Column 2, beginning with line 56, cancel all to and including column 4, line 29, and insert the matter appearing on the attached sheets. Column 7, line 33, "120b1F.," should read -- 120° F. --.

Signed and sealed this 10th day of April 1973.

(SEAL)
Attest:

EDWARD M. FLETCHER, JR.      ROBERT GOTTSCHALK
Attesting Officer            Commissioner of Patents Various diameters of discs may be used for different ranges of hardness, but the one most useful for the present purpose is one having a diameter of three-eighths inch. When harder fats are measured, a ¼ inch diameter disc is used. 440 grams pressure on the ¼ inch disc is equal to 1,000 grams pressure on the ⅜ inch disc, so a conversion of readings with the one instrument enables translation of readings into a single reference scale.

For the present purposes, a fat which is sufficiently hard to be termed "brittle," is one requiring 1,000 grams or more for penetration of a ⅜ inch disc for a distance of 0.1 inch.

Applying the foregoing modified durometer-penetrometer test to a series of fats of different hardness and hence of different brittleness, using a ⅜ inch disc, there were obtained the following results:

| Fat | Wt. (gr) required for 1/10 inch penetration | M.P. (°F.) |
|---|---|---|
| A | 100 | 88 |
| B | 500 | 86 |
| C | 600 | 85 |
| D | 700 | 87 |
| E | 1000 | 110 |
| F | 1150 | 98 |
| G | 1250 | 115 |

Of the foregoing fats only fats E, F and G meet the requirements of being brittle solids. Of these three fats, only fat F is of preferred overall quality since its melting point falls within the preferred range of 90°–105°, approximating body heat.

Fats having the above noted desirable characteristics may be derived by fractional distillation and/or solid crystallization of the well known edible oils such as cottonseed oil, soya bean oil, cocoanut oil, corn oil, safflower oil, lard, or the hydrogenated derivatives of these fats. Fractional distillation and solvent crystallization may be effectuated using standard techniques.

For example, in solid crystallizing, the fat may be dissolved in liquid propane and chilled to precipitate the desired fat fraction. The mixture then may be centrifuged or filtered to separate the solid fat from the undesirable components, principally lauric acid. The latter is not a preferred fat since it imparts poor shelf life and stability to the product.

If desired, fats of varying derivation may be blended together in order to derive at the desired physical qualities. The object of such blending is to provide a fat which has a narrow plastic range, i.e., a narrow range between softening point and melting point. Thus there may be mixed together a fat having a narrow plastic range and low melting point with a fat having a high melting point and with a dispersing agent which acts as a bridging material. The net result is a product having the desired intermediate melting point and narrow plastic range.

One example of a suitable blending fat is a margarine oil having the following specifications:

| | °F. | Index |
|---|---|---|
| Solid fat index | 51 | 29–31 |
| | 70 | 18–20 |
| | 95 | 3–4 |
| Moisture | | none |
| Free Fatty acid | maximum | 0.05% |
| Peroxide Value | maximum | 0.3 m.e. |

Another example of a suitable fat is a confectioners fat having the following specifications:

|  | °F | Index |
|---|---|---|
| Solid fat index | 51 | 53–57 |
|  | 70 | 43–47 |
|  | 89 | 24–28 |
|  | 108 | 7–12 |
| Wylie melting point |  | 115° F. |
| Moisture |  | none |
| Free fatty acid | maximum | 0.05% |
| Iodine value |  | 50 |

A third example of a suitable fat is a hydrogenated vegetable oil having the following specifications. (Durkee's "Melvo")

| Color (Lovibond) | 2r–20y |
|---|---|
| Free Fatty acid | 0.20 (maximum) |
| Wylie Melting Point | 99–103 |
| Stability (OAM) | 200 hours |

A fourth example of a suitable fat is Durkee's "Kaomel," a fraction of hydrogenated vegetable oils having the following specifications:

| Color (Lovibond) |  | 2.0r–20y (max.) |
|---|---|---|
| Free Fatty acid |  | 0.20 (max.) |
| Wylie Melting Point |  | 98–100.5 |
| Solid Fat Index | °F. |  |
|  | 50 | 72±3 |
|  | 70 | 66±3 |
|  | 80 | 59±3 |
|  | 92 | 23±3 |
|  | 100 | 5 (max.) |
| Stability (AOM) |  | 200 hours (min.) |

A fifth illustrative fat is Durkee's "CCC." This is a hydrogenated vegetable fat having the following American Oil Chemists Association specifications:

| Color (Lovibond) |  | 3r–30y (Max.) |
|---|---|---|
| Free fatty acid |  | 0.20 (Max). |
| Congeal Point |  | 37–1 |
| Solid Fat Index | °F. |  |
|  | 50 | 55±3 |
|  | 70 | 45±3 |
|  | 92 | 25±2 |
|  | 104 | 9±1.5 |
|  | AOM - Stability | 200 hours (min.) |

In addition, there may be incorporated to advantage with the fatty material a suitable dispersing or emulsifying agent for assisting in emulsifying the fat with the water during preparation of the final sauce. The dispersing agent employed should be compatible with the fat, edible and not adversely affected by storage.

The dispersing agents employed in stabilizing foods, i.e., the mono- and diglycerides of the fat-forming higher fatty acids such as stearic acid, oleic acid and their hydrogenated derivatives are particularly suitable.

Also suitable are such edible emulsifying agents as the sorbitan fatty acid esters, the polyoxyethylene sorbitan fatty acid esters, the polyoxyethylene sorbitol esters, the polyoxyethylene fatty acids, and the poloxyethylene higher aliphatic alcohols, e.g., lauryl, cetyl, stearyl, oleyl and tridecyl alcohols.